March 14, 1961  A. ROBERT ET AL  2,975,289

TRACKING DEVICES

Filed June 25, 1957  5 Sheets-Sheet 1

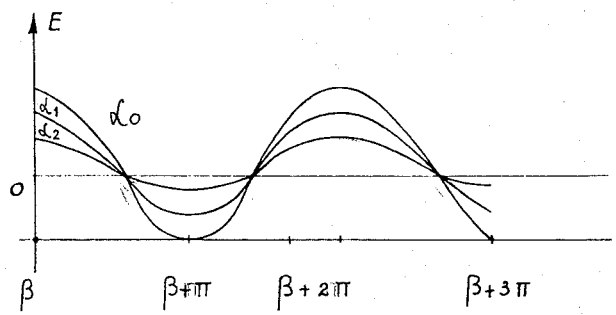
FIG. 6
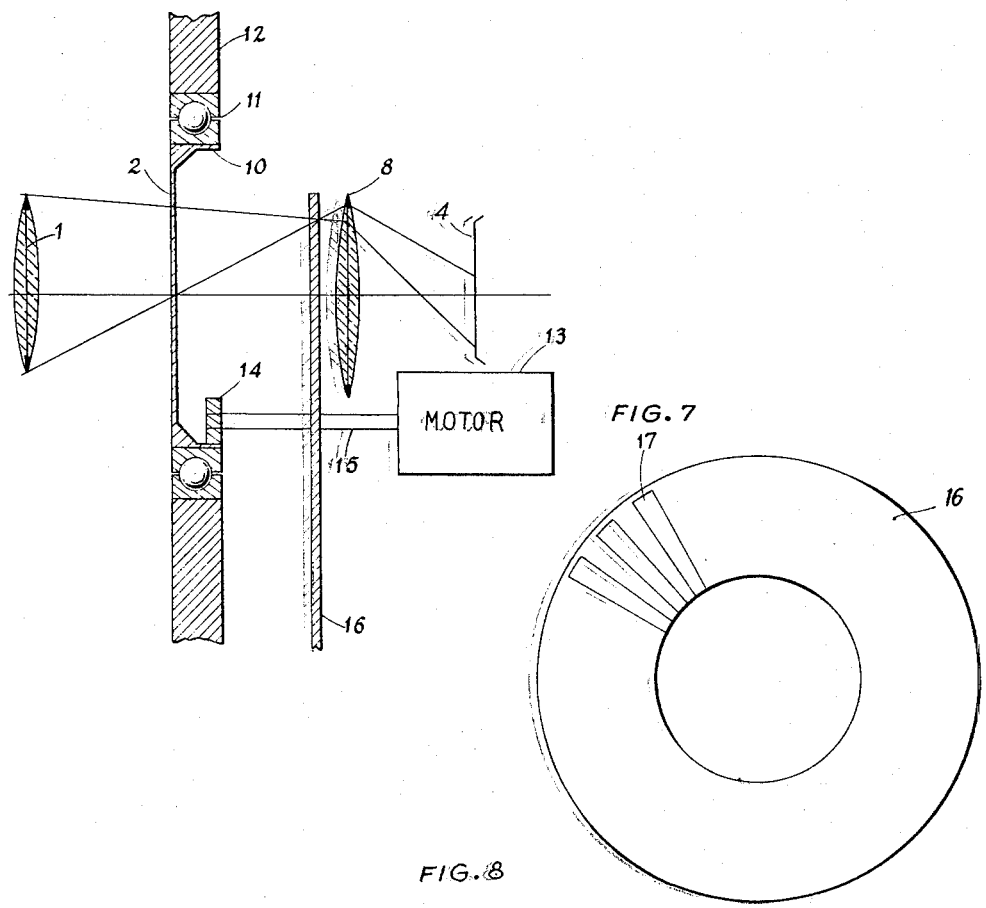
FIG. 7
FIG. 8

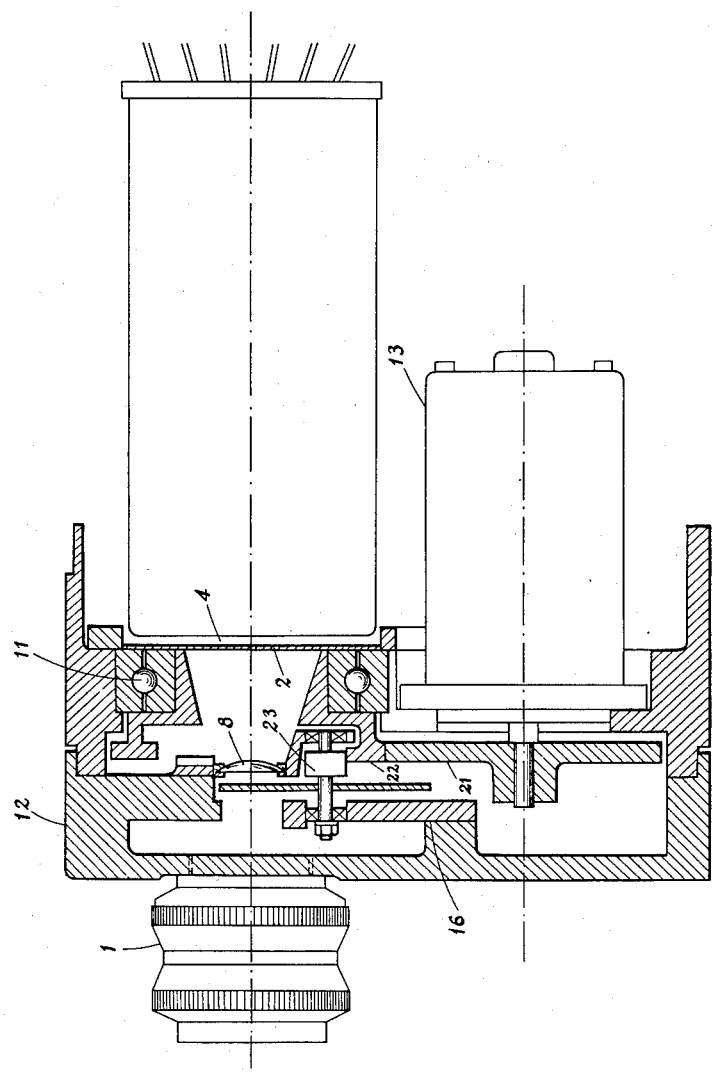

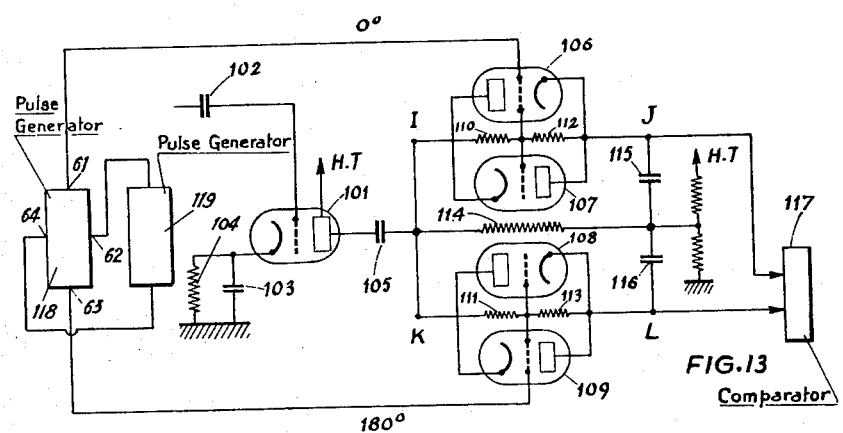
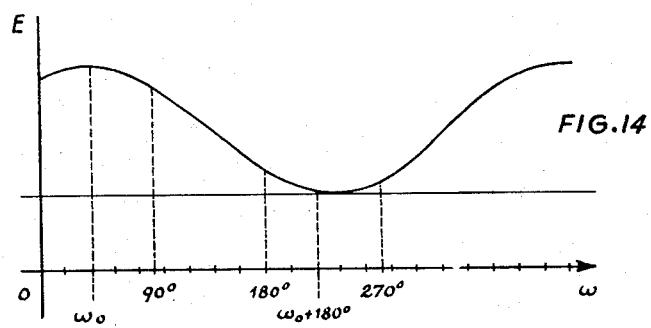
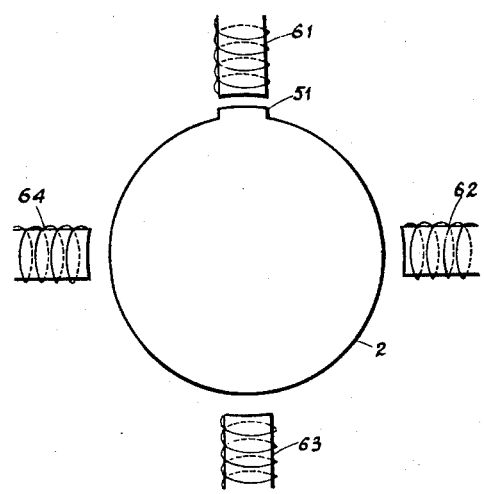

United States Patent Office 2,975,289
Patented Mar. 14, 1961

2,975,289

TRACKING DEVICES

André Robert and Jean Deslandes, Paris, France, assignors to Compagnie Generale de Telegraphie Sans Fil, a corporation of France Filed June 25, 1957, Ser. No. 667,758

Claims priority, application France June 26, 1957

5 Claims. (Cl. 250—203)

The present invention relates to target tracking or direction-finding systems and, more particularly, to systems for measuring the elevation and the azimuth of a mobile target emitting luminous energy, these systems being of the type comprising an optical and an electronic device. The optical device generally includes an objective assembly producing, in the focal plane thereof, a real image of the target to be located. The coordinates of this image in the focal plane with respect to two right-angle axes which are normal to the axis of the lens, are proportional to the elevation and to the azimuth of the light source, i.e. of the target. The electronic device includes a system for translating these coordinates into electrical magnitudes.

The degree of accuracy of the systems of the above type closely depends on the degree of perfection with which the optical system forms the image. The various aberrations inherent to such systems, such as achromatism, aplanatism, astigmatism, etc., may give rise to errors and inaccuracies, in particular in the marginal portions of the field of sight. The optical systems which are to be used, if a satisfactory degree of accuracy is to be achieved, are thus necessarily bulky and costly.

The present invention has as an object the provision of a target tracking or direction finding system of the above outlined type which does not require the use of a highly precise objective and yet provides indications with a great degree of accuracy, even though the objective it incorporates displays substantial aberrations.

The invention will be best understood from the following description and appended drawings, wherein:

Figs. 1, 2 and 3 are auxiliary diagrams illustrating the underlying principle of the optical device employed in a system according to the invention;

Fig. 4 schematically shows the system according to the invention;

Fig. 6 is a family of curves explaining the operation of the optical device shown in Fig. 4;

Figure 9:
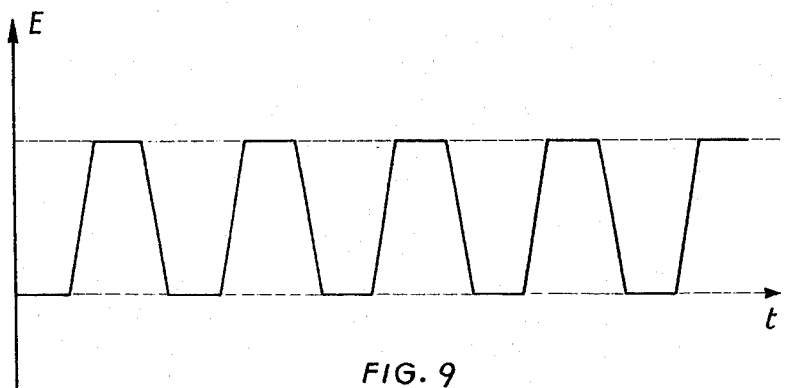
Figure 10:
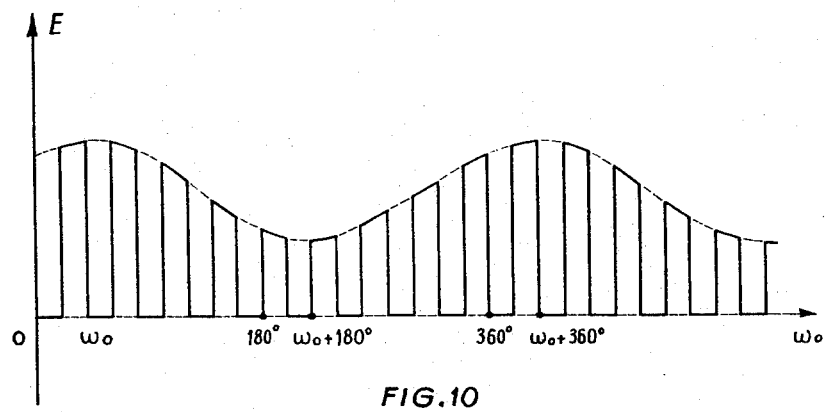
Figure 11:
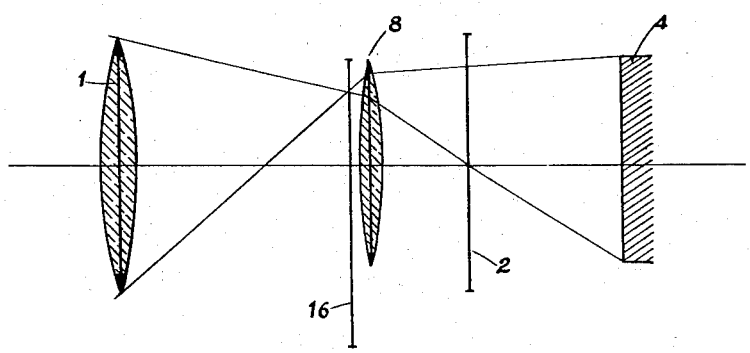

Fig. 7 diagrammatically shows an embodiment of the system according to the invention;

Fig. 8 is a detail of the system shown in Fig. 7;

Figs. 9 and 10 are curves explaining the operation of the system in Fig. 8;

Fig. 11 diagrammatically illustrates another embodiment of the system according to the invention;

Fig. 12 shows with more detail another embodiment of the invention;

Fig. 13 shows, by way of example, an electric circuit adapted for use with the system according to the invention.

Figs. 14 is a curve explanatory of the operation of the device in Fig. 13;

Fig. 15 is a detail of the system according to the invention.

Figure 1:
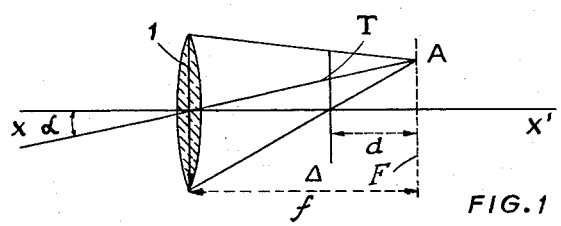
Figure 3:
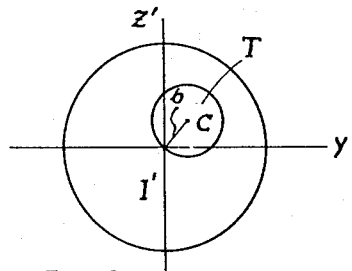

According to Fig. 1, an objective 1, which is shown as comprising a single lens, has an optic axis $XX'$ and a focal plane F, which is perpendicular to the plane of the figure. This objective produces in its focal plane a point image A of a luminous point object located at infinity in a direction forming an angle $\alpha$ with axis $XX'$. Of course, angle $\alpha$ is not necessarily in the plane of the drawing. The luminous rays from the source intercepted by objective 1 form a cone with point A as its apex and having for its base the entry pupil of the objective. If an opaque screen $\Delta$ is placed perpendicularly to the optical axis at a distance $d$ from focal plane F, a luminous spot T will appear on the screen, the center C of spot T being situated at a distance $b$ from the optic axes, as shown in Fig. 3, with $b$ equal to $(f-d) \tan \alpha$, where $f$ is the focal distance of the lens.

The diameter of spot T is $$\frac{d.D}{f}$$

where D is the diameter of the entry pupil of objective 1. As may be seen, the diameter of this spot does not depend on the direction defined by angle $\alpha$, while distance $b$ from its center to axis $XX'$ is a function of angle $\alpha$. This distance $b$ will be designated in the following as the "co-latitude" of the source with respect to the objective.

Figure 2:
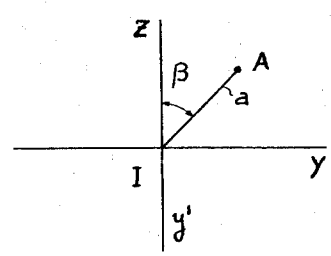

Fig. 2 is a section of the luminous beam by the focal plane of objective 1. This section comes down to a point A, located at a distance $a$ from the optic axis, with $a = f \cdot \tan \alpha. I$ being the trace of axis $XX'$ on the focal plane, line IA makes an angle $\beta$ with axis $YY'$, normal to axis $XX'$. This angle $\beta$ will be hereinafter called the "longitude" of the light source with respect to the objective.

The angular position of the light source with respect to the objective 1, i.e. its direction with respect to the center of the pupil entry of the objective, is determined once angles $\alpha$ and $\beta$ are known.

It is apparent that center C of luminous spot T is at the same angle $\beta$ with respect to axis $I'Z'$, parallel to axis IZ.

In brief, distance $b$ from point C to axis $XX'$ is proportional to $\tan \alpha$ or to $\alpha$, $\alpha$ being of the order of 10', and its polar angle is equal to $\beta$. Moreover, the radius of the spot is independent of angles $\alpha$ and $\beta$ and depends only on the position of plane $\Delta$.

Figure 4:
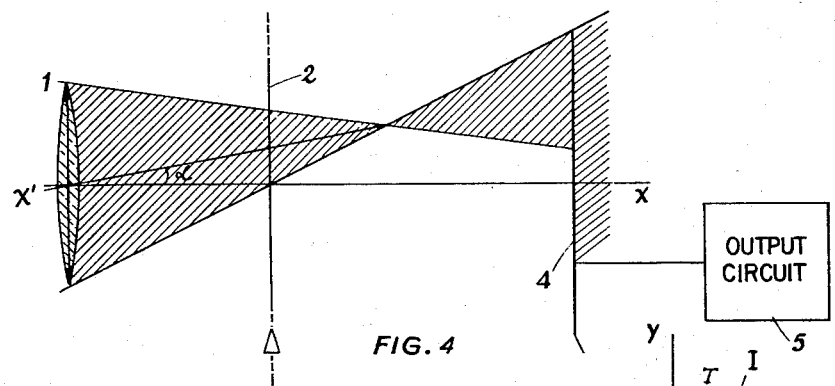

Fig. 4 schematically shows the operation principle of the optical device comprised in the system of the invention.

In this figure, the same references designate like elements as in the preceding figure.

Figure 5:
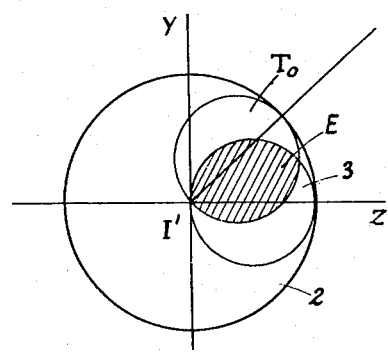
Figs. 5 and 5a are explanatory diagrams relating to the system illustrated in Fig. 4.

Plane $\Delta$ is positioned in such a manner that, $2\alpha_0$ being the total field encompassed by objective 1, the luminous spot corresponding to a co-latitude $\alpha_0$ is tangent to the optic axis $XX'$ of objective 1. An opaque disc 2, shown in Fig. 5, is mounted in plane $\Delta$ in such a manner as to rotate about the optic axis $XX'$. This disc is provided with a circular hole 3, the circumference of which passes through its center. The diameter of this circumference is preferably equal to $$\frac{d.D}{f}$$

A photoelectric cell 4, whose active surface is perpendicular to the optic axis, is located behind disc 2 and its output is fed to an output circuit 5.

It could be readily shown that $d$ is connected to $\alpha_0$ by the relation:

$$d = \frac{2f^2 \tan \alpha_0}{D + 2f \tan \alpha_0}$$

Assuming first that luminous spot $T_0$ is produced by a source of co-latitude $\alpha_0$ and of longitude $\beta$, and that its diameter is equal to that of hole 3, the periphery of this spot passes through center I of disc 2. While rotating, the latter lets pass a quantity of luminous energy which is proportional at any instant to the common portion E of the respective areas of hole 3 and spot $T_0$, which portion E is hatched in Fig. 5. In the case illustrated, area E covers the whole of hole 3, when the plane Δ the polar angle $\omega_1$ of the center of hole 3 is equal to the longitude $\beta$ of the spot. Area E is reduced to nothing when this polar angle is equal to $\omega_2 = \beta + \pi$. If means are provided for measuring the luminous energy passing through the disc and for determining the angular position of the latter, it will suffice to determine the positions corresponding to $\omega_1$ and $\omega_2$ in order to determine the longitude $\beta$, since the luminous energy collected by cell 4 is zero for $\omega_2 = \beta + \pi$, and maximum for $\omega_1 = \beta$.

Figure 5A:
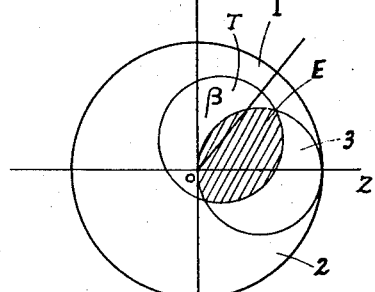

Assuming now that the luminous source has a co-latitude smaller than $\alpha_0$, which is the case in Fig. 5a, the periphery of spot $T_1$ is spaced from the periphery of disc 2. It is apparent that, while disc 2 is rotating, hatched area E varies from a minimum $E_2$ for $\omega_2 = \beta + \pi$ to a maximum $E_1$ for $\omega_1 = \beta$.

Of course, for $\alpha = 0$, i.e. when the source direction coincides with the direction of the optic axis, area E is constant.

Fig. 6 shows the variations of E as a function of $\omega$ for a same value of $\beta$ and for decreasing values $\alpha_0$, $\alpha_1$, $\alpha_2$ . . .

This figure shows that ratio $$\frac{E.\max.}{E.\min.}$$

is lower as $\alpha$ is smaller. This ratio is a univocal function of $\alpha$.

The photoelectric cell receives a luminous energy proportional to E. Its output current is connected to the input of a device 5, which measures the ratio $$\frac{E.\max.}{E.\min.}$$

and the phase of the minimum values of E. Magnitudes $\alpha$ and $\beta$ are thus perfectly known.

Fig. 7 shows, by way of example and in a very diagrammatic manner, an embodiment of the system according to the invention. Disc 2 is placed behind objective 1, as previously described, and includes a rim 10 supported through a ball bearing 11 in a frame 12. It is rotated by a motor 13 through a gear 14. Secured on shaft 15 of motor 13 is a disc 16, shown in Fig. 7 as disposed substantially in the focal plane of objective 1. It is made of an opaque material, such as metal for instance, and is provided, as shown in Fig. 8, with notches or slots 17, distributed on the periphery thereof. Behind disc 16, and in close proximity thereto, is located a lens 8 in front of which is placed photoelectric cell 4.

The operation of the device is as follows:

Slotted disc 16, allows all of the luminous beam to pass each time a slot moves across the latter. This will be the case even if slots 17 are given a relatively small transversal dimension, since the cross-section of the beam is the smallest in the region of the focal plane and, accordingly, this dimension will still be large with respect to the maximum transversal dimension of the beam in the focal plane. The beam is, of course, intercepted each time a solid portion of disc 16 moves across it.

Thus, the luminous energy incident on the cell is modulated and passes through successive maxima and minima. If, for instance, disc 16 rotates at 3600 r.p.m., i.e. has a frequency of 60 cycles, and if it carries 50 slots, the beam will thus be intercepted 3000 times per second.

Fig. 9 is a curve displaying the variations in time of the luminous energy incident on cell 4, assuming that disc 2 has been removed and that motor 13 rotates with a uniform velocity. This curve is a succession of teeth, and of the intervening slots, respectively corresponding to the disc positions where the disc lets the whole of the light energy pass and impinge upon cell 4 and to the positions in which it intercepts the beam. Maxima and minima, which are equal to zero, are connected through substantially straight lines, corresponding to intermediate positions of the disc, i.e. to positions where it intercepts a more or less substantial portion of the beam.

Actually, disc 2 and disc 16 are both driven by motor 13. The rotation frequency of disc 2 is of the order of 25 r.p.m. This results in the super-imposition of the modulation of the luminous energy by the action of hole 3 on the modulation produced by the slotted disc 16, the frequency of which is much greater. This makes it possible to obtain from cell 4 an electric signal of a comparatively high frequency, equal for instance to 3 kc./s., with abundant harmonics, due to the presence of the rectangular tooth modulation, and modulated at a much lower frequency. Such a signal is much easier to amplify.

Fig. 10 illustrates a signal thus obtained, the variable being $\omega$, i.e. the polar angle of the center of hole 3, assuming that motor 13 rotates with a uniform velocity.

The angular coordinates of the target, i.e. the co-latitude and the longitude, are thus given by the phase of the modulation curve and by the ratio $$\frac{E.\max.}{E.\min.}$$

respectively.

Electronic device 5 must therefore be able, on the one hand, to measure the modulation ratio of the signal and the modulation phase, on the other hand.

Lens 8 is adapted to deflect the luminous beam onto the optic axis, thus making possible the use of a photoelectric cell of a smaller size.

Fig. 11 diagrammatically shows another arrangement of the optical arrangement used in the system according to the invention. According to this arrangement, disc 16 and lens 8 are still in the vicinity of the focal plane. However, disc 2 is placed behind the lens. Cell 4 is in the plane where lens 8 forms the image of objective 1. Consequently, when disc 2 does not intercept the luminous rays, the latter are concentrated on the photoelectric cell. A cell thus arranged has a better signal-to-noise ratio.

Fig. 12 diagrammatically shows a sectional view of an embodiment of an optical device of the above type.

Objective 1 is a conventional objective for small size photography having a focal distance of 50 mm. and an aperture of 1.9 mm. Motor 13 drives both discs 2 and 16 by means of a gear 21, which meshes with a toothed rim 22 with which disc 2 is provided and which drives disc 16 through a gear 23.

Fig. 13 shows an embodiment of an electric circuit adapted to translate into electrical magnitudes the signals supplied by the optical devices.

This circuit comprises an amplifier tube 101 to the grid of which is applied, through a capacitor 102, the signal derived from cell 4. The cathode of this tube is grounded through a capacitor 103 and a resistance 104, arranged in parallel.

The anode of tube is connected through a capacitor 105, to the respective anodes of tubes 107 and 109 and to the respective cathodes of tubes 106 and 108, tube 106 has its anode connected to the cathode of tube 107 and vice versa. Tubes 108 and 109 are connected in the same way.

The respective grids of tubes 106 and 107 are connected together, as are those of tubes 108 and 109, and the respective junction points of these two pairs of grids are connected to one terminal of resistors 110, 112 and 111, 113 respectively, all of these resistors being of the order of one megohm. The respective other terminals of resistors 110 and 111 are connected in parallel to capacitor 105, while the respective other terminals of resistors 112 and 113 are respectively connected to the cathode of tube 106 and the anode of tube 107, on the one hand, and to the cathode of tube 108 and anode of tube 109, on the other. Capacitor 105 is further connected to the respective other terminals of resistors 112 and 113, through a resistor 114 and capacitors 115 and 116, respectively. Resistor 114 is of the order of 10,000 ohms. The common terminal of capacitors 115 and 116 is brought, as is the anode of tube 101, to a high D.C. potential. The other two terminals of these capacitors are connected to a comparator device 117.

A pulse generator 118 transmits, in a manner hereinafter described, positive pulses onto the grids of tubes 106 and 107, when disc 2 is in its initial position, and to the grids of tubes 108 and 109, when disc 2 has rotated by 180°.

It also sends positive pulses to a circuit, exactly similar to the circuit just described and very diagrammatically shown at 119, when disc 2 has rotated by 90° and by 270° from its 0° position.

Considering first tubes 106 and 107, the operation of the system of Fig. 13 is as follows: at any moment, point I of the circuit, which point is directly connected to the anode of tube 106 and to the cathode of tube 107, has a potential which is a function of the signal applied to the grid of tube 101. If none of the tubes 106 and 107 is conducting, point J maintains its potential, since capacitor 115 can discharge only through resistances 110 and 112 the values of which are very high. When generator 118 applies a positive pulse to the grids of tubes 106 and 107, disc 2 passing through the position 0°, this renders positive the grids of the tubes 106 and 107 with respect to corresponding cathodes, on account of the resistors 112 and 110, respectively. That one of these two tubes in which the anode bias is higher than that of the cathode, say tube 107, becomes conductive and resistors 110 and 112, are by-passed by the much lower inner resistance of the corresponding tube, 106 or 107. Thus, points I and J take up substantially the same potential.

In the interval comprised between two pulses, none of the tubes 106 to 109 is conductive, due to self-bias of their respective grids. Point J thus maintains the potential assumed by point I when disc 2 has passed for the last time through position 0°, while this latter potential is changing due to the rotation of disc 2.

When the second pulse occurs, point I has changed its potential if the latter is higher than the potential of point J, tube 106 is conductive and returns point J to the potential of point I. Tube 107 is non-conductive.

In the same way, pulse generator 118 applies positive pulses to the grids of tubes 108 and 109 when disc 2 has rotated by 180° from 0° position.

Point L, homologous of point J, will thus maintain the potential assumed by point K, homologous of point I, during the last passage of disc 2 through the 180° position. Respective potentials of points J and L are compared by a comparing device 117, which may, for instance, comprise a direct current amplifier.

As already mentioned a circuit 119 compares, in the same way as described above, the potentials supplied by the cell when disc 2 is in at the 190° and 270° positions. It can be shown that these data are proportional to $$\frac{E \max.}{E \min.} \cos \beta \text{ and to } \frac{E \max.}{E \min.} \sin \beta$$

respectively, i.e. to the right angle coordinates of the center of hole T in plane A.

These voltages may be used as control voltages in remote-controlled systems.

Fig. 15 shows how disc 2 positions of 0°, 180, 90° and 270° may be determined. To this effect, disc 2 carries at its periphery a magnet 51, secured along the axis of hole 3. Four coils 61, 62, 63, 64 are placed on a fixed armature, so that the magnet successively moves past each one thereof. These coils produce current pulses which are fed to the circuit of Fig. 13.

The advantages of the system lie mainly in the fact that, contrary to the known systems of this type, it is not the image of the source which is used but the beam of light produced thereby. This makes it possible to employ very simple conventional optical systems including one or two lenses only, aberrations due to sphericity and astigmatism being without effect on the operation of this system as a whole. The only aberrations which should, as far as possible, be avoided and which are of the second order, are those due to the coma effect, so that the modulation curve should not present secondary peaks which might slightly deform the axial indications.

It should also be noted that the simplicity and the sturdiness of this optical system arrangement make the system of the invention particularly suitable for use in remote infrared range, where optical systems are difficult to realize, if a workable image is to be obtained.

What we claim is:

1. In a tracking apparatus for tracking a target emitting luminous energy: an optical objective, having a focal plane and an optical axis, for focusing said energy; and opaque rotatable disc outside this focal plane, centered on said optical axis, for intercepting at least a portion of said energy and having a hole the periphery of which passes through the center of said disc; and light responsive means, located in a plane parallel to said focal plane, for generating a voltage proportional to the luminous energy passing through said hole; and means for measuring the amplitude and the phase of the ratio of the maximum of this voltage to its minimum, during one turn of said disc.

2. In a tracking apparatus for tracking a target emitting luminous energy: an optical objective, having a focal plane and an optic axis, for focussing said energy; an opaque rotatable disc, centered on said optical axis, located for intercepting at least a portion of said energy and having a hole the periphery of which passes through the center of said disc; a second rotatable disc, located substantially in said focal plane, having regularly spaced slots; means for rotating simultaneously said first and second discs with predetermined angular velocities; and means comprising a photo cell located in a plane parallel to said focal plane, for measuring the amplitude and the phase of the ratio of the maximum of the luminous energy, passing both through said hole and said slots, to its minimum during a turn of said disc.

3. In a tracking apparatus for tracking a target emitting luminous energy: an optical objective, having a focal plane and an optic axis, for focussing said energy; an opaque rotatable disc, centered on said optic axis, located for intercepting at least a portion of said energy and having a hole the periphery of which passes through the center of said disc; a second rotatable disc located substantially in said focal plane and having regularly spaced slots; means for rotating simultaneously said first and second discs with predetermined angular velocities; and means, comprising a photo-electric cell, located in a plane parallel to said focal plane positioned for receiving luminous energy passing both through said hole and said slots, said cell having an output; means for generating a pulse each time said first disc has rotated by an angle equal to $$\frac{n}{2}\pi$$

with respect to a fixed position, and $n$ representing successively each of the integers 0, 1, 2, 3 and 4 and means, connected to said output, for measuring the luminous energy collected by said cell each time one of said pulses occurs.

4. In a tracking apparatus for tracking a target emitting luminous energy: an optical objective, having a focal plane and an optic axis, for focussing said energy; an opaque rotatable disc, centered on said optic axis, located for intercepting at least a portion of said energy and having a hole the periphery of which passes through the center of said disc, a second rotatable disc located substantially in said focal plane and having regularly spaced slots; means for rotating simultaneously said first and second discs with predetermined angular velocities; means comprising a photoelectric cell, located in a plane parallel to said focal plane, and positioned for receiving luminous energy passing both through said hole and said slots, said cell having an output; means for generating a pulse each time said first disc has rotated by angles respectively equal to 0°, 90°, 180°, 270°, and 360° with respect to a fixed position; and means for comparing the respective amounts of luminous energy collected by said cell when said disc has rotated from said fixed position by 0° and by 180° on the one hand, and by 90° and 270° on the other.

5. Apparatus according to claim 4 in which said means for comparing the respective amounts of luminous energy comprises a pulse generator having four outputs for generating a pulse each time said first disc has rotated by one of said angles and two arrangements, each including two circuits, each circuit comprising a pair of tubes having an anode, a cathode and a grid, said grids being interconnected, two connections respectively between the anode of one tube and the cathode of the other tube of said pair and a resistor, having a middle point, connecting said two connections and by-passing the cathode-anode space of said tubes, said middle point being connected to said grids, the output of said cell being connected to one of said connections in each of said circuits and a comparator device, coupled to the respective other two connections of each circuit, said interconnected grids of one arrangement being connected for respectively receiving said pulses for 0° and 180° positions of said disc and the interconnected grids of the other arrangement for respectively receiving said pulses for 90° and 270° positions of said disc.

References Cited in the file of this patent

UNITED STATES PATENTS

| | | |
|---|---|---|
| 2,431,510 | Salinger | Nov. 25, 1947 |
| 2,444,933 | Jasperson | July 13, 1948 |
| 2,713,134 | Eckweiler | July 12, 1955 |